United States Patent
Kalavity (12)

(10) Patent No.: US 6,253,478 B1
(45) Date of Patent: Jul. 3, 2001

(54) HOLDER FOR RECEIVING A PLACARD WITH INDICIA AND METHOD OF HOLDING

(75) Inventor: Karen F. Kalavity, Denver, CO (US)

(73) Assignee: Integra Design, Inc., Denver, CO (US)

( * ) Notice: Subject to any disclaimer, the term of this patent is extended or adjusted under 35 U.S.C. 154(b) by 0 days.

(21) Appl. No.: 09/262,404

(22) Filed: Mar. 4, 1999

(51) Int. Cl.[7] .............................. G09F 23/00; G09F 3/18
(52) U.S. Cl. ................. 40/645; 40/658; 40/661; 40/611
(58) Field of Search .................. 40/5, 611, 645, 40/649, 658, 661, 766, 606, 607, 634, 642.02, 661.03, 661.08, 763, 771

(56) References Cited

U.S. PATENT DOCUMENTS

| | | | |
|---|---|---|---|
| 833,663 | 10/1906 | Bateman | 40/645 |
| 1,674,005 | 6/1928 | Eschenbach | 40/645 |
| 1,889,281 | 11/1932 | Fitzgerald | 40/645 |
| 2,000,419 | * 5/1935 | Sarber | 40/660 X |
| 2,181,977 | 12/1939 | Magovern | 40/645 |
| 2,207,180 | 7/1940 | Smith et al. | 40/645 |
| 2,540,221 | * 2/1951 | Ten Hoeve et al. | 40/763 X |
| 2,790,257 | 4/1957 | Ware | 40/645 |
| 2,835,994 | * 5/1958 | Kuefner | 40/645 |
| 4,304,059 | 12/1981 | Tisbo et al. | 40/645 |
| 4,534,125 | 8/1985 | Buck | 40/645 |
| 5,214,871 | * 6/1993 | DiCataldo, Sr. | 40/649 |
| 5,331,758 | * 7/1994 | Romick | 40/661 |
| 5,537,767 | * 7/1996 | Schneider et al. | 40/606 |

* cited by examiner

*Primary Examiner*—Brian K. Green
(74) *Attorney, Agent, or Firm*—Macheledt Bales & Johnson LLP

(57) ABSTRACT

A holder for receiving a placard with indicia, comprising a unitary upper member having a backing and a front face, at least a portion of which is transparent, the placard to be positioned therebetween. The front face and backing each have a lower edge portion oppositely positioned. An outwardly-directed protuberance extends above, and generally the length of, each of the lower edge portions. Each protuberance can have an eave. A recessed top portion of a support member receives and engages the lower edge portions. The engagement of the upper member to the support can be by way of sliding or downward snap- or press-fit engagement. The lower edge portions may inwardly dovetail (whether to the point of releasable interlock). A first vertical-side of the backing can be sealed along a first vertical-side of the front face and the recessed top can have open and closed ends. Also, a method of holding a placard to display an indicia thereon, comprising the steps of: positioning the placard between and through oppositely located lower edge portions of each of a backing and a front face of a unitary upper member, a portion of the front face being transparent for the displaying of the indicia; and engaging the lower edge portions within a recessed top portion of a support member such that at least a portion of an undersurface of each of an outwardly-directed elongated protuberance that extends respectively above each of the lower edge portions, abuts the recessed top portion.

11 Claims, 6 Drawing Sheets

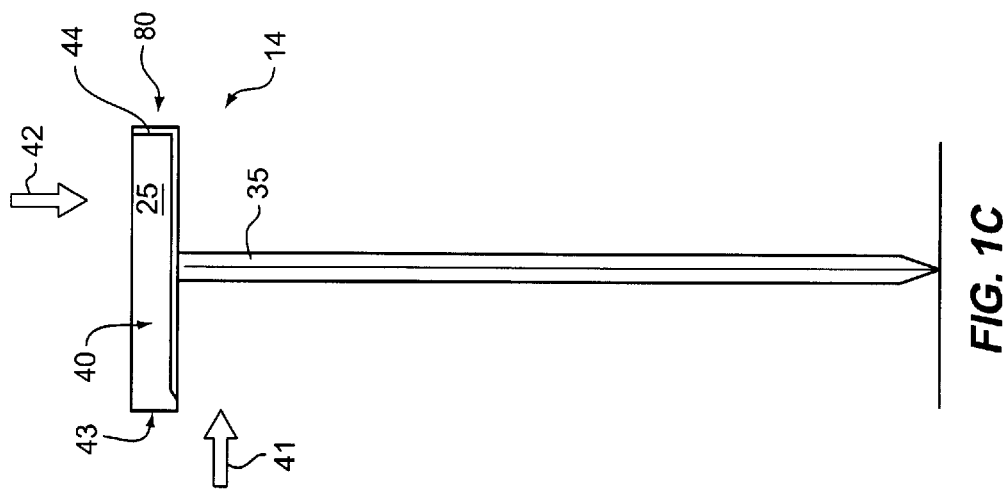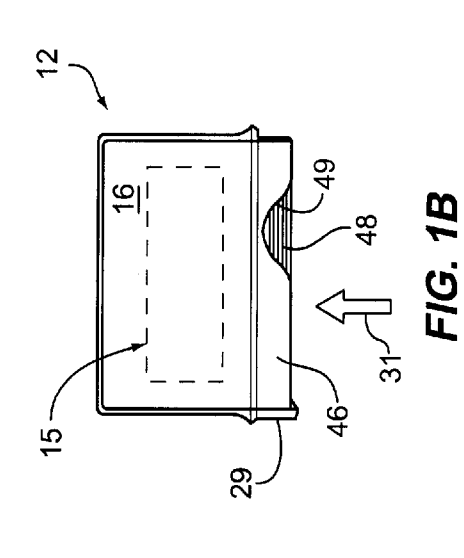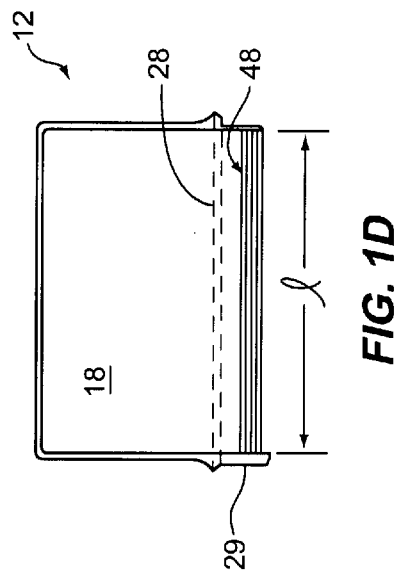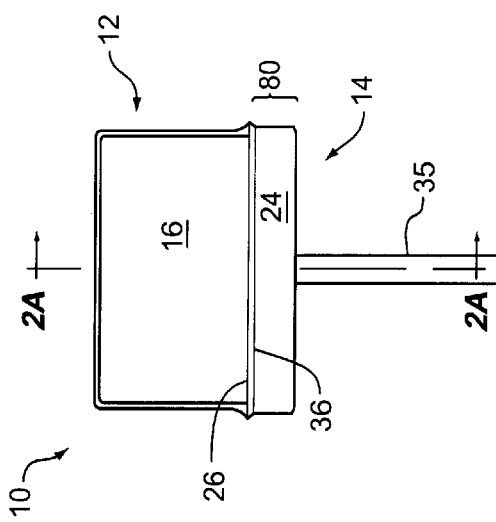

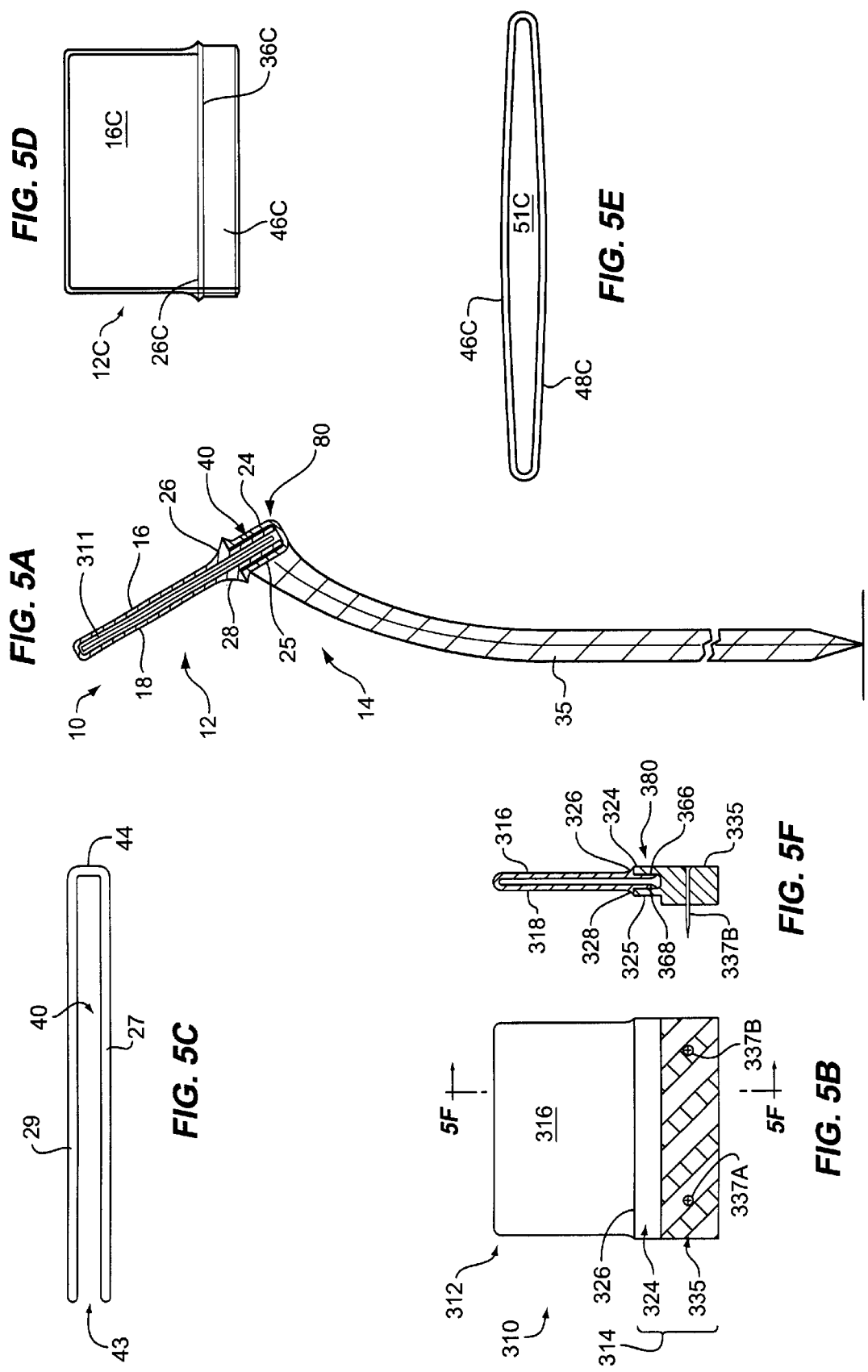

HOLDER FOR RECEIVING A PLACARD WITH INDICIA AND METHOD OF HOLDING

BACKGROUND OF THE INVENTION

In general, the present invention relates to convenient means by which to display, inside or outdoors, information about: a product being offered for sale in a wholesale or retail establishment; a home for sale; seeds planted in a garden (garden marker); a type of zoo animal; identification of a natural wonder (such as one might find along a nature trail); and so on. More particularly, this invention relates to a novel holder structure and method of holding a placard with identifying indicia having a unitary upper member engageable to a support member (from which a base may extend, the shape of which will depend upon the environment in which the holder will be used). The upper member has a backing and a front face through which at least a portion of the indicia is visible once a placard is inserted. The support has a recessed top portion for receiving and novel engagement of the upper member.

Many different types of garden markers are available for the formally-trained, as well as recreational gardener. Commercially available seed and plant identification markers tend to have simpler designs so as to not complicate the process of identifying what has been planted. Identification of what lies below ground is especially important for proper care of a plant. If too difficult, or over burdensome, to identify plant variety (including instructions for proper care) at the time of planting—it often simply doesn't get done. Very few of us remember the specific herb, flower, vegetable, tree, shrub, etc. we've planted without a marker located nearby. Proper identification of all types of plants (including trees and shrubs) within an in-door botanical garden, as well as plant nurseries, is also necessary.

While others have proposed various solutions to address the problem of moisture and dirt destroying a marker used outdoors, none of these proposed prior designs offer a simple, yet effective and inexpensive, means of identifying a type of plant that can accommodate seed packets or other existing labeling included with a plant when purchased. Upon closer study, one can see these prior proposed solutions are not feasible for use on a larger, broader scale (both indoors and out) to display identifying indicia taken from existing labeling/packaging such as to offer a home or its contents for sale (yard sign), announce an outdoor event (picnic or festival) give information about a product on sale (price, model), identify a natural wonder or animal along a trail, identify trees in an outdoor nursery, etc.

Therefore, a simple, yet versatile and readily manufacturable solution was needed to place identifying indicia, whether taken from existing labeling, on display. One can appreciate that the novel placard holder and method of the invention described herein, provides moisture-resistant support sized to accept placards, large and small of many shapes (such as empty seed packets or other product packaging, business cards, product literature and advertisement materials, yard or event signs, photos, garment hang-tags, etc.) without requiring substantial modification of existing/ preprinted labeling. The innovative placard holder and method are designed for operation in a wide range of uses, whether indoors or out. Placards can be inserted and removed with relative ease (and without special tools) by a salesperson, gardener, ranger, events coordinator, etc. The two pieces of the simple placard holder can then be engaged and (1) "staked" into the ground or other support-medium (for example, to identify plants in one's garden or plant products for sale within a greenhouse, as a yard sign to announce an event, estate sale or sale of a home, and to identify a natural wonder, zoo animal, or deli-product for sale); (2) clipped, or otherwise fastened, to existing product shelving or bookshelves; (3) secured to, or built/molded integral with, a self-standing weighted base so that it can be readily repositioned; and so on.

Unlike garden markers currently available, the holder and method of the invention can accept a placard through oppositely positioned lower edges of a backing and front face of an upper member, and then be engaged within a recessed top portion of a support (it is not critical that this engagement result in a water-resistant seal along the lower edges of the upper member) such that an outwardly-directed protuberance extends generally the length of the recessed top portion. As will be appreciated, in the spirit of the design goals of the instant invention: the upper member's lower edges (preferably contoured to correspond with the contour of the recess in the top portion) may be suitably engaged within the support's recessed top portion by sliding engagement, downward snap-fit or press-fit engagement, and so on; the lower edge portions may inwardly dovetail (whether, or not, to the point of interlocking); and the outwardly-directed protuberance may be of many different shapes.

SUMMARY OF THE INVENTION

It is a primary object of this invention to provide a holder for receiving a placard with indicia comprising a unitary upper member having a backing and front face, each with a lower edge portion engageable within a recessed top portion of a support member such that an outwardly-directed protuberance generally extends the length of the recess once the upper member is engaged with the support. Within the spirit and scope of the invention, it is an object to provide a holder and method that can accept a placard of many different sizes for use in a wide variety of environments (both indoors and out). An additional object of this invention includes providing a method of holding a placard to display an indicia thereon.

The advantages of providing the innovative placard holder and method of holding, as described herein, are as follows: (a) Design versatility—providing a two piece holder into which existing labeling/packaging may be inserted and engaged in a simple fashion makes it easy to display accurate information about a wide variety of things, including plants in one's own garden or plant products for sale in a greenhouse, as well as information about a flower arrangement, an event, estate sale, sale of a home, a natural wonder, zoo animal, and retail product for sale; (b) Ease of effective use—placards can be inserted and removed with relative ease (and without special tools) and can be kept dry, if necessary, as encased within the backing and front face of the upper member; (c) Design simplicity—the novel holder as designed with only a few simple components is inexpensive to build, easy to assemble/incorporate with a existing shelving, and components can be replaced if broken; and (d) Design flexibility—the novel holder can be used indoors and outdoors and its base can be "staked", clipped, fastened, or integrated with/molded into existing structure/media (without requiring modification thereof) and without taking up a great deal of space.

Briefly described, the invention includes a holder for receiving a placard with indicia, comprising a unitary upper member having a backing and a front face, at least a portion of which is transparent. The front face and backing each have a lower edge portion oppositely positioned so the placard may be inserted therebetween. An outwardly-directed protuberance extends above, and generally the length of, each of the lower edge portions. A recessed top portion of a support member is included for receiving and engaging the lower edge portions. Each protuberance can have an eave. Once the upper member is engaged within the support, each eave will extend generally over first and second edges of the recessed top portion. The engagement of the upper member to the support can be by way of sliding or downward snap- or press-fit engagement. The lower edge portions may inwardly dovetail (whether to the point of releasable interlock) upon, or prior to, engagement of the upper member within the recessed top portion.

Also characterized herein, is a holder for receiving a placard with indicia, having both of its lower edge portions engaged within a recessed top portion of a support member. The lower edge portions may have an outwardly-bulbous shape and the recessed top portion a correspondingly contoured inside surface. A first vertical-side of the backing can be sealed along a first vertical-side of the front face and the recessed top portion can have a closed end and an open end for receipt, by sliding engagement, of the lower edge portions.

The invention also includes a method of holding a placard to display an indicia thereon, comprising the steps of: positioning the placard between and through oppositely located lower edge portions of each of a backing and a front face of a unitary upper member, a portion of the front face being transparent for the displaying of the indicia; and engaging the lower edge portions within a recessed top portion of a support member such that at least a portion of an undersurface of each of an outwardly-directed elongated protuberance that extends respectively above each of the lower edge portions, abuts the recessed top portion. The step of engaging can include sliding the lower edge portions between an open end of a first and second edge of the recessed top portion, or downwardly inserting the lower edge portions between the first and second edges of the recessed top portion. Prior to (or in conjunction with) engaging the upper member to the support, one could dovetail (by way of releasable interlock, for example) the oppositely located lower edge portions. The method can also include the step of providing an eave for each protuberance that extends generally over the first and second edges of the recessed top portion once the lower edge portions have been engaged within the recessed top portion. Each of these eaves can have an inner surface that generally abuts an outer surface of a respective one of the first and second edges upon the engaging. The method can also include the step of staking into ground (or other surface/media) a base that is integral with, or secured as an add-on component to, the support member.

BRIEF DESCRIPTION OF THE DRAWINGS

The invention will be more particularly described by referencing the accompanying several drawings (labeled "FIG.") of the preferred and alternate embodiments, in which like numerals designate like parts.

FIG. 1A is a front plan view of a placard holder 10 having an upper member and a support member shown, respectively, in the front plan views labeled FIGS. 1B and 1C.

FIG. 1D is a cutaway front plan view of an upper member 12 of the invention illustrating one structural means by which to releasably interlock the lower edge portions of the upper member prior to, or upon, engagement of the upper member with the support shown, also in a cutaway front view, at 14 in FIG. 1C.

The front view labeled

FIG. 5A is a sectional of the FIG. 1A holder, again taken along 2A—2A.

FIG. 5B has both a front plan view and a sectional view of an alternate holder.

FIG. 5C is a top plan looking down on one embodiment of the recessed top portion of the support member.

FIGS. 5D (front plan view) and 5E (bottom plan view looking up) illustrate alternate structure for the upper member (similar to that shown in FIG. 1B).

FIG. 5F is a sectional view of the alternate holder shown in FIG. 5B.

DETAILED DESCRIPTION OF THE PREFERRED EMBODIMENTS

Figure 2B:
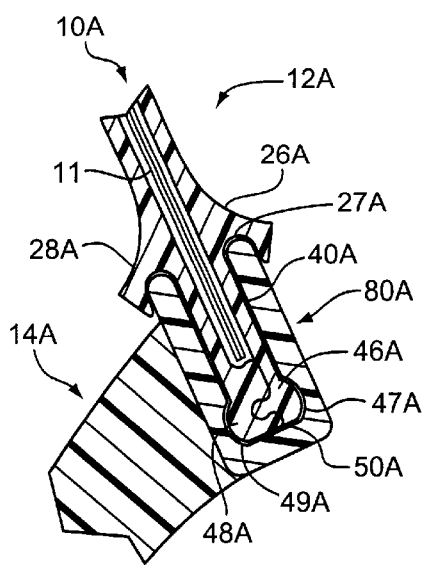
FIG. 2B is a partial sectional view similar to that shown in FIG. 2A, but illustrating alternate means of engagement and of dovetailing the upper member's lower edges.
Figure 2C:
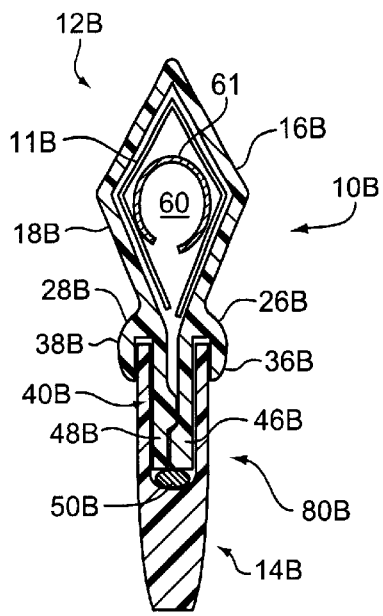
FIG. 2C is a partial sectional view similar to that shown in FIG. 2B, illustrating alternate means of dovetailing the upper member's lower edges and alternate structure for the protuberances extending there above, as well as alternate structure for the upper member.

The two members (12, 14) of the preferred placard holder 10 illustrated in FIG. 1A have been engaged such that from this front plan view one can see the front face 16 and an elongated protuberance 26 extending there below along with an eave 36 extending over a front ledge 24 of recessed top portion 80 of support 14. Here, support 14 has a stake 35 which can be fabricated integral with recessed top 80 or secured thereto by way of suitable adhesive, fasteners, and the like. As will be described in greater detail in connection with the sectional views labeled FIGS. 2A–C, protuberance 26 is outwardly-sloped and juxtaposed an outside surface of an eave 36 (in FIGS. 2A–C, shown inwardly-tapered) to provide an overhang assembly that can prevent dirt and moisture buildup within recess 40.

At least a portion of the front face 16 is preferably transparent (as shown in phantom as a window-section 15 in FIG. 1B) so that indicia on a placard inserted, for instance in the direction of arrow 31, can be viewed through upper member 12. Upper member 12 may be built for display of a placard in many ways such as molding, extruding, machining, and otherwise fabricating (using techniques well known in the art) the whole of the front face 16 out of a transparent polymeric material and then securing (using suitable adhesive, if necessary) the front face to a backing (at 18 in FIG. 2A). Or, one might choose to mold or cut a transparent window-section (such as that at 15) separately, then insert and secure the window-section (in a press-fit fashion) into a generally opaque upper member 12 made of any of a number of different lightweight materials. Or, it may be desirable to fabricate both the backing 18 and front face 16 as a single molded, extruded, formed, or machined piece of transparent material. Many lightweight plastics are suitable for use in fabricating the novel features of upper member 12. Preferred materials include those that have sufficient structural integrity to support a placard inserted for display, and that resist degradation/ discoloration which otherwise might result from contact with dirt, moisture, and/or exposure to inclement weather. Suitable plastics include: a thermosetting synthetic allyl resin which can be made optically clear and resists most solvents; the thermoplastic ionomer resin (containing both covalent and ionic bonds) used in bottles and toys; cellulose acetate butyrate (also a thermoplastic) which has high impact resistance, clarity, and weatherability and is used in making plastic film, lenses, and outdoor signs; polyethylene, a tough thermoplastic that can be molded, extruded, calendered, cast, and vacuum formed; and so on.

Figure 2A:
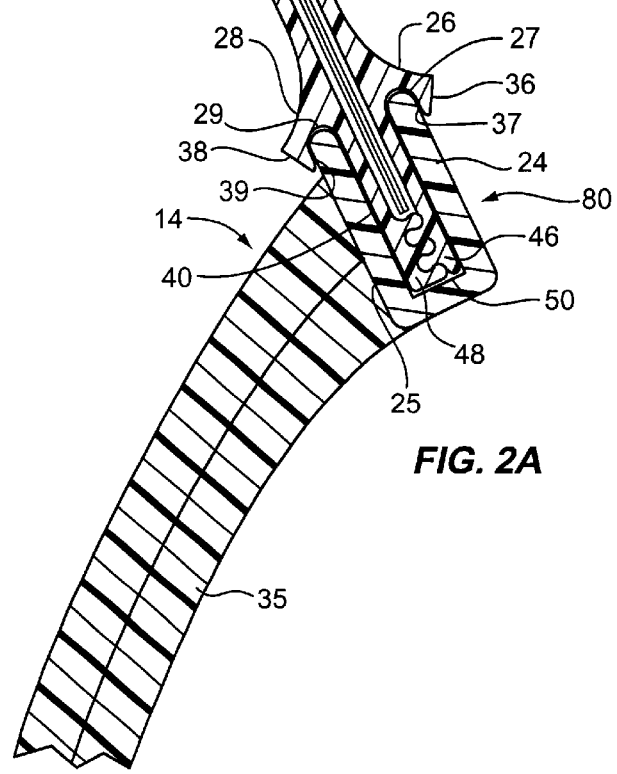
FIG. 2A is a sectional view taken along and between 2A—2A of FIG. 1A illustrating an upper member operatively engaged within a support such that it is angled rearwardly.

The upper member 12 in FIG. 1B includes a thumb-sized cutout 49 in the lower edge portion 46 of front face 16, behind which one can view a portion of the inwardly scalloped lower edge 48 of backing 18 (see, also, FIG. 2A which details how the scallops of both lower edge portions 46, 48 can be designed to dovetail in a tongue and groove manner). Furthermore, a protective overhang 29 may be molded into one end of the lower edge portions 46, 48 of upper member 12. This overhang structure 29 can operate to keep dirt and moisture out from recess 40 once upper member 12 has been engaged in support 14 (whether by sliding engagement along the direction of arrow 41 in FIG. 1C or by downward engagement along the direction of arrow 42 in FIG. 1C). The front plan view of support 14 in FIG. 1C has front ledge 24 cutaway so that back ledge 25 of recessed top portion 80 can be viewed, one end of which is closed (at 44) and one end of which is open (at 43) for receiving the lower edge portions 46, 48 of upper member 12 upon engagement along the direction of arrow 41. FIG. 1D illustrates upper member 12 without a front face 16 so that backing 18, having a protuberance extending there behind (shown in phantom 28), can be viewed with its scalloped lower edge 48.

The FIG. 2A sectional view of the preferred holder shown assembled with a placard 11 retained within upper member 12, better illustrates the many novel features of this invention. The front face 16 and backing 18 of upper member 12 each have a protuberance 26, 28 that extends above and generally the length of lower edge portions 46, 48 (see front plan view FIG. 1B and the representative length labeled "" in FIG. 1D). Once an upper member 12 has been engaged within recessed top 80, preferably at least a portion of the undersurface (not labeled for simplicity) of each protuberance 26, 28 abuts front and rear edges (respectively 27, 29) of recessed top portion 80. Although not critical, support 14 has been designed so that upper member 12 angles rearwardly for ready display of indicia on placard 11. Each protuberance 26, 28 is shown with an eave 36, 38 extending therefrom——each eave has an inner surface 37, 39 contoured so that it may abut an outer surface (not labeled for simplicity) of a respective edge 27, 29 of recessed top 80 upon engagement of upper member 12 with support 14. As one can appreciate: Contour of the undersurfaces of protuberances 26, 28 will depend upon the shape of the surfaces of edges 27, 29 (here, each is curved); The contour of front face 16 and backing 18 will depend upon the contour of placard 11 (see, for example, FIG. 2C which has a diamond shape); and The contour of recess 40 will depend upon that for the lower edge portions (e.g., see FIG. 2B at 46*a*, 48*a*).

The cross-sectional views labeled FIGS. 2B and 2C, similar to the view in FIG. 2A, illustrate design features that further distinguish the holder of the invention from known plant marker solutions. Although not critical, a key advantage to molding an eave contoured to overhang and abut an outer surface of each recessed top edge 27 and 29, is that moisture and dirt are much less likely to buildup within recess 40. By preventing moisture and dirt buildup in recess 40, the recessed top 80 will not become a source for making the placard wet or soiled. Furthermore, oppositely located lower edge portions 46 & 48, 46*a* & 48*a*, 46*b* & 48*b* in FIGS. 2A–C are shown dovetailed in several different configurations (which may be of a snap-fit type as is shown in FIGS. 2A and 2B). Key advantages to dovetailing oppositely located lower edge structures include retaining a placard 11 for display and preventing moisture and dirt buildup between front face 16 and backing 18. As one can appreciate, if dirt and/or moisture were to accumulate within recess 40, depending upon the material from which placard 11 has been made (e.g., paper card stock, photographic paper, coated/laminated brochures, etc.), dirt and moisture may be absorbed ("wick-up") by a placard 11 positioned within the front face 16 and backing 18 of an upper member engaged within the recess 40, likely ruining the placard. Furthermore, one might choose to dovetail lower edges 46, 48 by applying a force along opposite lower edges to create a snap-fit therebetween prior to engagement within recessed top portion 80, or it may be more convenient to dovetail lower edges 46, 48 upon engagement within recessed top portion 80.

Although the invention is not limited as such, recessed top portion 80 and lower edge portions 46, 48 in FIG. 2A (and those shown in other FIGS.) can be molded, formed, cast, or machined to precise dimensions as necessary, preferably out of a durable material capable of some elastic deformation (that is to say, the deformation generally disappears upon release of the load/force being applied to the material). Suitable materials for holder designs shown in the drawings include resilient durable, weather-resistant plastics that can be deformed without breakage: upon opening opposite lower edge portions (especially if not initially shaped with a spacing 51*c* as is shown in FIG. 5E) to insert a placard therebetween; upon the application of force used to snap-fit the lower edge portions together; as well as upon the application of force to engage the lower edge portions within a correspondingly contoured recessed top (whether by sliding or downward motion). Other materials suitable for use must be capable of meeting tolerances and load-deformation specifications, and be weather-resistant (moisture, temperature, sun, fertilizer, etc.) if holder is used outdoors.

By way of background, as is known: Whether deformation of any component is primarily "elastic" depends upon the size of the load/force and the length of time the load/force is applied. As one increases the load applied to an "elastic-plastic" material shape (i.e., it exhibits both types of deformation), elastic deformation is initially observed; thereafter, by increasing the load still further a point is reached at which permanent bending/deformation occurs and remains after release of the load (referred to as plastic deformation). The modular design of the instant invention makes it easy to replace a severely permanently plastically-deformed, or fractured/broken, upper member 12 or support 14.

It is critical that the placard holder of the invention be made of a material that provides enough friction or counteracting force between the outer surfaces (such as alternatively-shaped curved surfaces labeled 47a, 49a in FIG. 2B) of respective lower edge portions (e.g., the bulbous-shaped edges in FIG. 2B at 46a, 48a) and the inner surfaces of the recess structure (e.g. 40a), to sufficiently engage an upper member (e.g., 12a) within a respective support (e.g., 14a), so that a placard 11 can be displayed. The alternative holder labeled 10a in FIG. 2B illustrates how corresponding inner surfaces of a recess 40a can likewise be contoured to provide additional structure for engagement.

The alternative holder 10b of FIG. 2C can accommodate a diamond shaped (in cross-section) placard 11b which can be inserted in a sliding fashion into area 60 and pressed against the walls of front face 16b and backing 18b via spring clip 61 (inserted in a similar sliding fashion). If holder 10b is to be used outdoors, once a placard has been inserted, a diamond-shaped plastic cap, for instance, may be snapped onto each end of the upper member 12b to keep out dirt and moisture. To further illustrate the design flexibility of the invention, alternative structure is shown in FIG. 2C for the dovetailing of lower edges 46b, 48b, the protuberances 26b, 28b, as well as eaves 36b, 38b extending therefrom. Although not critical, an elongated packet (at 50b) of a moisture-absorbing material (e. g., silica gel) may be positioned at the bottom of recess 40b prior to engaging upper member 12b therewithin, to aid in absorbing any moisture that may be trapped within recess 40b.

Figure 3A:
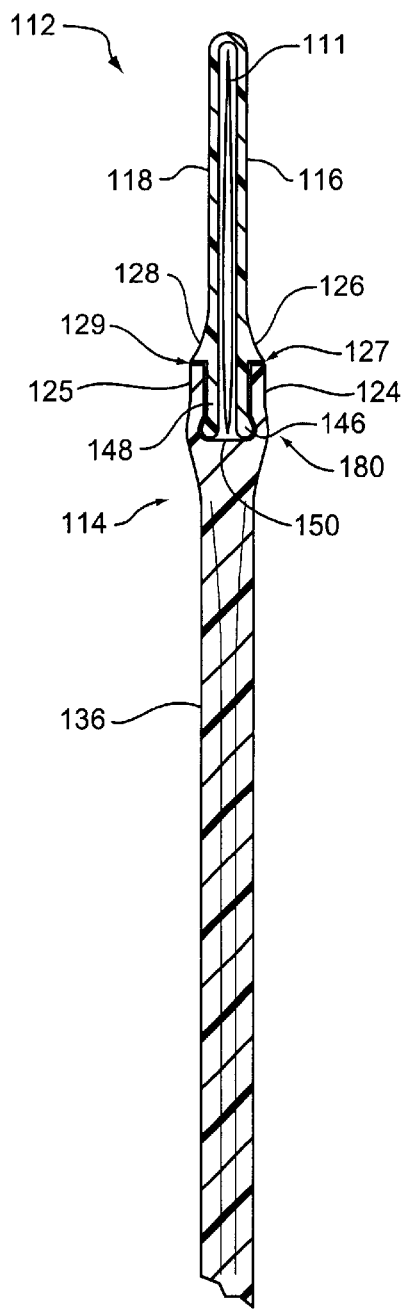
FIG. 3A is a sectional view (similar to FIG. 2A view) of an alternative embodiment of the invention with FIG. 3B illustrating a front plan of a seed placard being inserted (upwardly along the direction of arrow 120) within alternate upper member 112.

The alternative holder in FIG. 3A is shown with a placard 111 (such as a sunflower seed packet) inserted in upper member 112, which has been engaged within the contoured recess (not labeled) formed between front ledge 124 and back ledge 125 of recessed top 180. An undersurface of each protuberance 126, 128 abuts a respective flat surface of one of the edges 127, 129 of recessed top 180. Lower edge portions 146, 148 are bulbous in shape to fit within the contour of the recess (not labeled for simplicity). Here, no particular dovetailing between lower edges 146, 148 is shown at 150. The Giant Sunflower seed packet 111 is inserted upwardly in the direction of arrow 120 (here, by hand 121 in FIG. 3B) into upper member 112. The front face 116 and backing 118 are fabricated with very little, if any, space therebetween so that the bulging of seed packet 111 is sufficient for retaining it until upper member 112 is engaged within recessed top portion 180. The stake 136 of support 114 may be inserted into ground, stuck into a bowl of potato salad or sliced beef in a deli-counter, stuck into the foam-support of a flower arrangement, and so on.

Figure 4:
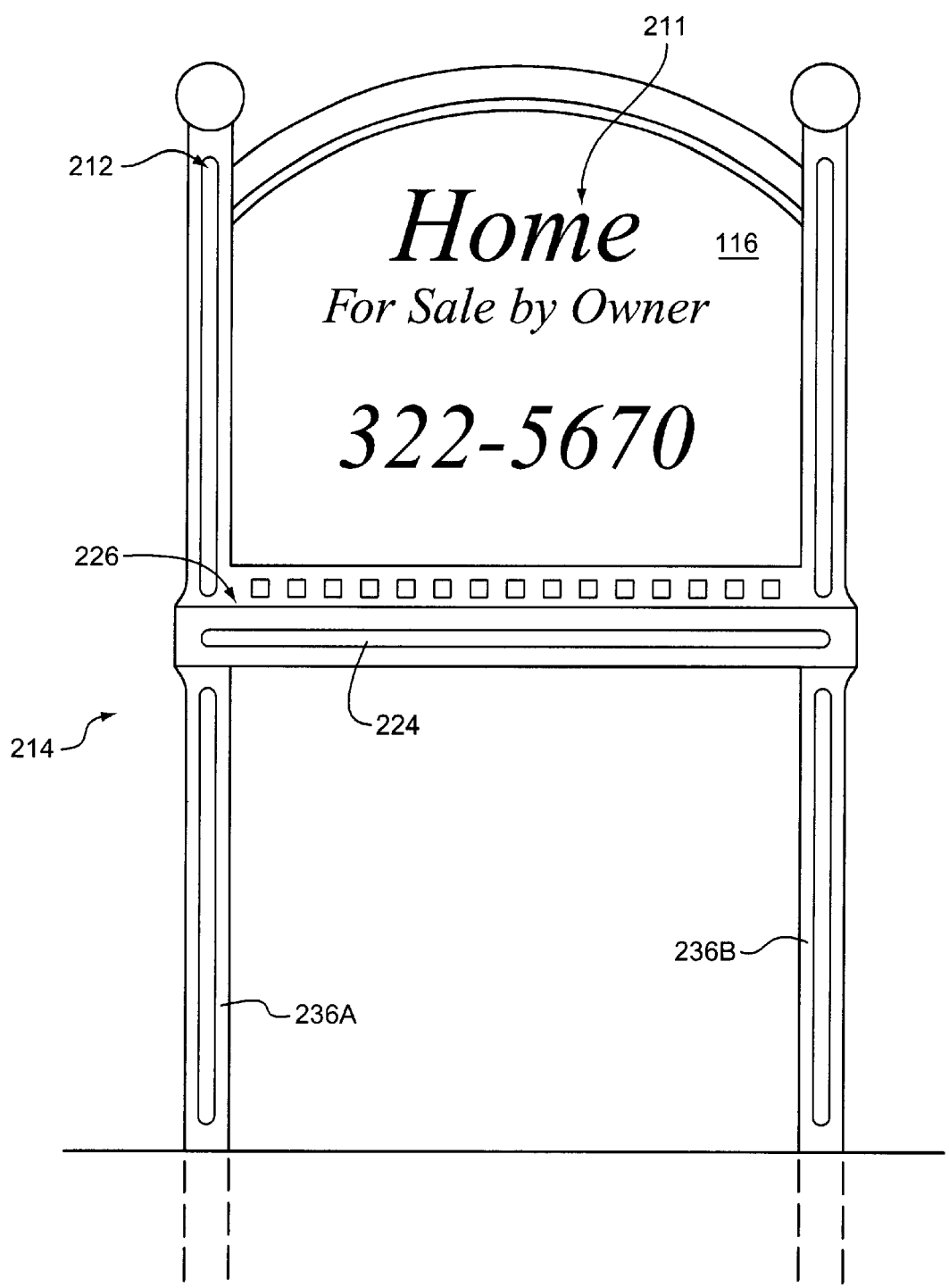
FIG. 4 illustrates an alternative (larger-sized) holder of the invention staked within the ground.

The yard sign embodiment in FIG. 4 has a FOR SALE placard 211 inserted into upper member 212 having a protuberance 226 extending generally the length of front face 116 and over the front ledge 224 of support 214 (which also has two stakes 236a, 236b).

For easy reference in connection with discussing FIGS. 5A–E, a sectional view of holder 10 (taken along 2A—2A of FIG. 1A) is shown in FIG. 5A with a thicker placard 311. FIG. 5B has both a front plan and a sectional view (taken along 5—5 of the front plan view) illustrating the novel features of, yet, another holder embodiment 310. Here, upper member 312 has a front face 316 with an outwardly-directed protuberance 326 extending therealong and over the front ledge 324 of support 314. The base 335 of support 314 has decorative lattice and fasteners 337a–b which can be secured to shelving, display boxes, a display table, and the like. Suitable fasteners 337a–b include screw(s), rivet(s), a nut and bolt, a weld-joint, material-compatible adhesives, nylon hooks-and-loops (such as VELCRO™), thermal-bonding (if the base 335 and the shelving/table to which it will be fastened are plastic), and so on. Although the type of fastener is not critical, the fastening means must be able to adequately secure the base 335 to the side of the shelving, or other display. As is easier to see in the sectional view in FIG. 5B, front face 316 has a protuberance 326 that extends over a slightly bulbous-shaped lower edge portion 366 and backing 318 has a protuberance labeled 328 that extends over a slightly bulbous-shaped lower edge portion labeled 368. An undersurface of each protuberance 326, 328 abuts a top edge of respective ledges 324, 325 of recessed top 380. FIG. 5C is a top view of front and back ledges 24, 25 of recessed top portion 80 illustrating open end 43 and closed end 44 (also labeled in FIG. 1C).

Figure 3B:
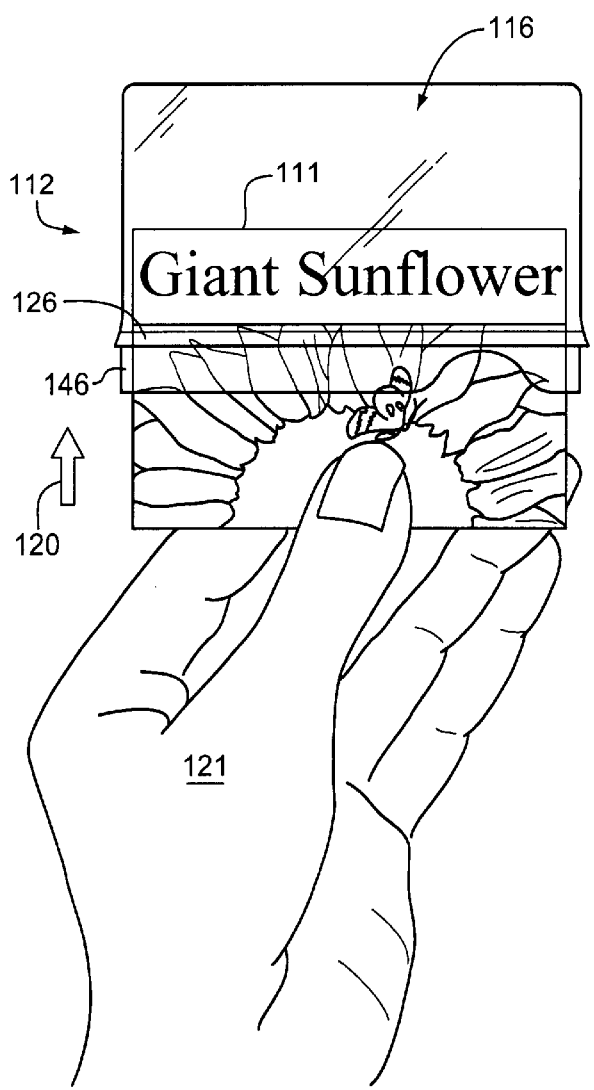

FIG. 5D is a front plan of another upper member 12c with a front face 16c, protuberance 26c and eave 36c extending therefrom and over lower edge portion 46c; and as illustrated from the bottom plan view FIG. 5E, the lower edges 46c, 48c form an elliptical shape around an opening 51c through which a placard (not shown) can be inserted (see, also, FIG. 3B illustrating a placard 111 being inserted through lower edges 146, 148). One can readily appreciate that the overall sizing of a holder of the invention can be small (such as one would find in a deli-case or a smaller-sized potted plant) to quite large (such as would be placed in a yard, zoo, along a nature trail or garden center, and so on). Furthermore, one can readily appreciate that the holder of the invention can accommodate existing labeling and packaging of varying shapes/sizes for display. The ease with which one can insert a placard into a holder of the invention, engage the upper member within a support member, and then position the holder for display of the indicia on the placard, makes using the holder a simple task. As has been mentioned, the pieces of the holder can be readily fabricated and manufactured using well known machining, molding, extruding, forming, cutting, and so on, techniques.

Figure 6B:
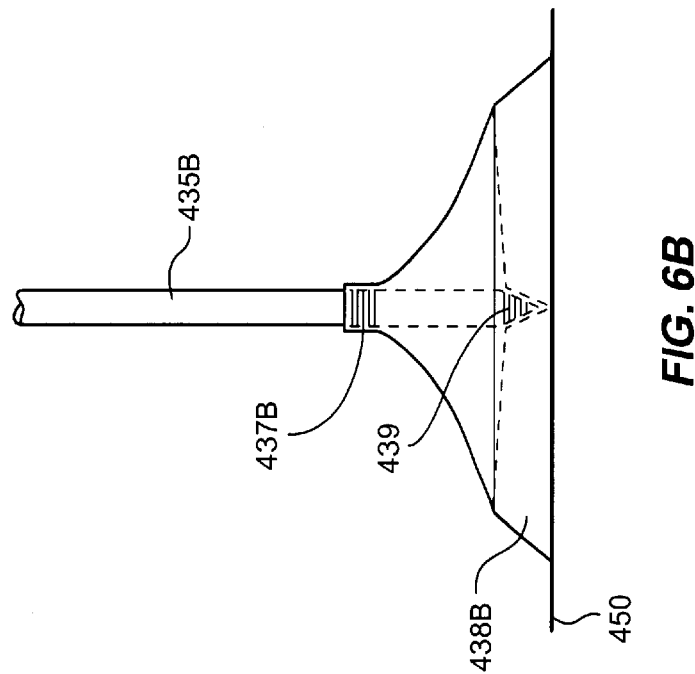
FIGS. 6A and 6B show front plan views of alternate bases (self-standing embodiments) comprising shafts connected to the support member (not shown in these illustrations) at their top end and inserted into a weighted-base that can stand atop ground.
Figure 6A:
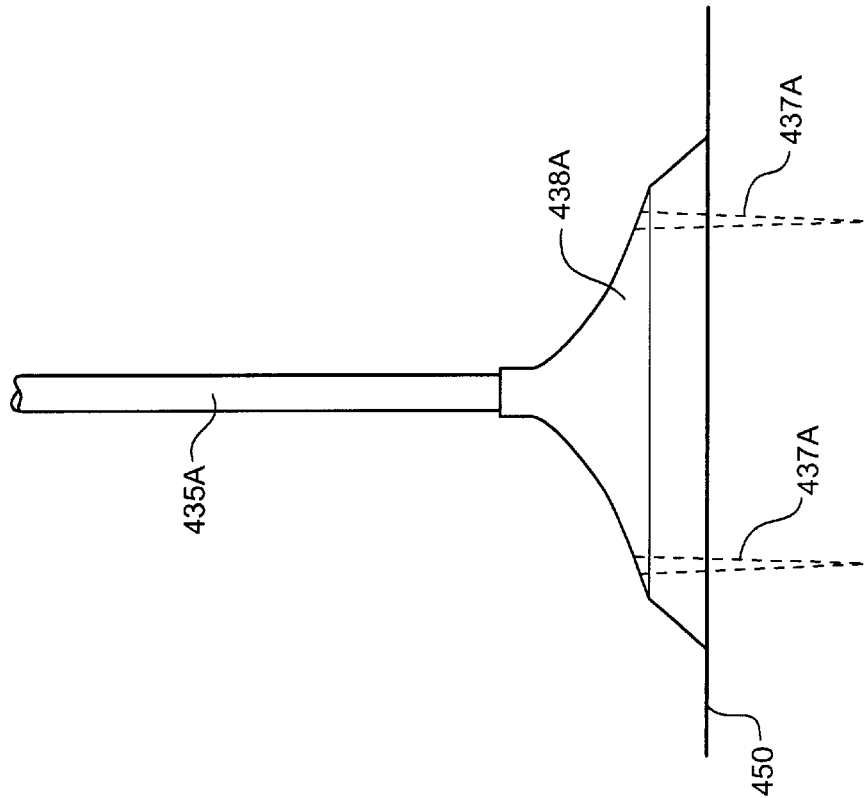

FIGS. 6A and 6B illustrate base-shaft sections 435a, 435b inserted into weighted bases 438a, 438b for use in free-standing holders of the invention. The weighted base labeled 438a of FIG. 6A includes one or more stakes 437a that may be inserted into ground 450 for added stability. The weighted base 438b of FIG. 6B has two threaded portions 437b and 439 that aid in stabilizing base-shaft section 435b.

While certain representative embodiments and details have been shown for the purpose of illustrating the invention, those skilled in the art will readily appreciate that various modifications may be made to the invention without departing from the novel teachings or scope of this invention. Accordingly, all such modifications are intended to be included within the scope of this invention as defined in the following claims. In the claims, any means-plus-function clauses used are intended to cover the structures described herein as performing the recited function and not only structural equivalents but also equivalent structures.

What is claimed is:

1. A holder for receiving a placard with indicia, comprising:
    a unitary upper member having a backing and a front face, at least a portion of which is transparent, said backing and front face adapted to receive the placard therebetween;

said front face and backing each having a lower edge portion, said lower edge portions oppositely positioned so the placard may be inserted therebetween;

an outwardly-directed protuberance extending in spaced relationship above, and generally along, each of said lower edge portions;

a recessed top portion of a support member for receiving said lower edge portions, a first and second edge of said recessed top portion to extend generally therealong, said first and second edges to abut at least a portion of an undersurface of each of said protuberances upon said receipt of said lower edge portions; and said first and second edges are curved to mate, respectively, to one of said protuberance undersurfaces, each of said protuberances is generally outwardly-sloped over said first and second edges upon a sliding engagement of said lower edge portions within said recessed top portion, a first vertical-side of said backing is sealed along a first vertical-side of said front face, and said lower edge portion of said backing is sealable to said opposite lower edge portion of said front face.

2. A holder for receiving a placard with indicia, comprising:

a unitary upper member having a backing and a front face, at least a portion of which is transparent, said backing and front face adapted to receive the placard therebetween;

said front face and backing each having a lower edge portion, said lower edge portions oppositely positioned so the placard may be inserted therebetween;

an outwardly-directed protuberance extending in spaced relationship above, and generally along, each of said lower edge portions;

a recessed top portion of a support member for receiving said lower edge portions, a first and second edge of said recessed top portion to extend generally therealong, said first and second edges to abut at least a portion of an undersurface of each of said protuberances upon said receipt of said lower edge portions; and said lower edge portions have a bulbous shape and said recessed top portion has a correspondingly contoured inside surface; and said lower edge portions are outwardly-bowed creating a space therebetween prior to a sliding engagement thereof within said recessed top portion.

3. A holder for receiving a placard with indicia, comprising:

a unitary upper member having a backing and a front face, at least a portion of which is transparent, said backing and front face adapted to receive the placard therebetween;

said front face and backing each having a lower edge portion, said lower edge portions oppositely positioned so the placard may be inserted therebetween;

an outwardly-directed protuberance extending in spaced relationship above, and generally along, each of said lower edge portions;

a recessed top portion of a support member for receiving said lower edge portions, a first and second edge of said recessed top portion to extend generally therealong, said first and second edges to abut at least a portion of an undersurface of each of said protuberances upon said receipt of said lower edge portions; and said lower edge portions are shaped to comprise a releasable interlock, and each of said protuberances comprises an eave extending generally over said first and second edges of said recessed top portion upon a downwardly-directed engagement of said lower edge portions within said recessed top portion.

4. A holder for receiving a placard with indicia, comprising:

a unitary upper member having a backing and a front face, at least a portion of which is transparent, said backing and front face adapted to receive the placard therebetween;

said front face and backing each having a lower edge portion, said lower edge portions oppositely positioned so the placard may be inserted therebetween;

an outwardly-directed protuberance extending in spaced relationship above, and generally along, each of said lower edge portions;

a recessed top portion of a support member for receiving said lower edge portions, a first and second edge of said recessed top portion to extend generally therealong, said first and second edges to abut at least a portion of an undersurface of each of said protuberances upon said receipt of said lower edge portions;

said lower edge portions are shaped to comprise a releasable interlock, and each of said protuberances comprises an eave extending generally over said first and second edges of said recessed top portion upon an engagement of said lower edge portions within said recessed top portion; and said releasable interlock comprises a tongue-and-groove joint, each of said eaves has an inner surface contoured to abut an outer surface of each of said first and second edges of said recessed top portion, and said top portion of said support further comprises a closed end and an open end for said receipt, by a sliding engagement, of said lower edge portions.

5. A holder for receiving a placard with indicia, comprising:

a unitary upper member having a backing and a front face, at least a portion of which is transparent, said backing and front face adapted to receive the placard therebetween;

said front face and backing each having a lower edge portion, said lower edge portions oppositely positioned so the placard may be inserted therebetween;

an outwardly-directed protuberance extending in spaced relationship above, and generally along, each of said lower edge portions;

a recessed top portion of a support member for receiving said lower edge portions, a first and second edge of said recessed top portion to extend generally therealong, said first and second edges to abut at least a portion of an undersurface of each of said protuberances upon said receipt of said lower edge portions;

said lower edge portions are shaped to comprise a releasable interlock, and each of said protuberances comprises an eave extending generally over said first and second edges of said recessed top portion upon an engagement of said lower edge portions within said recessed top portion; and said releasable interlock comprises a snap-fit joint, each of said protuberances is generally outwardly-sloped and juxtaposed an inwardly-tapered outside surface of each of said eaves, and said engagement of said lower edge portions results in a press-fit within said recessed top portion.

6. A holder for receiving a placard with indicia, comprising:
- a unitary upper member having a backing and a front face, at least a portion of which is transparent, said backing and front face adapted to receive the placard therebetween;
- said front face and backing each having a lower edge portion, said lower edge portions oppositely positioned;
- an outwardly-directed protuberance extending above, and generally along, each of said lower edge portions;
- a recessed top portion of a support member having a first and second edge extending generally in parallel along said recessed top portion, one end of which is closed and one end of which is open for receipt, by a sliding engagement, of said lower edge portions; and
- a cutout in at least one of said lower edge portions.

7. The holder of claim 6 wherein said lower edge portions comprise a releasable dovetail interlock upon said sliding engagement, said sliding engagement results in a press-fit within said recessed top portion; and further comprising a base extending from, and integral with, said support member.

8. A holder for receiving a placard with indicia, comprising:
- a unitary upper member having a backing and a front face adapted to receive the placard therebetween such that at least a portion of the indicia may be visible through said front face;
- said front face having a lower edge portion opposite a lower edge portion of said backing, both said lower edge portions being engaged within a recessed top portion of a support member;
- an outwardly-directed elongated protuberance extending in spaced relationship above, and generally along, each of said lower edge portions;
- a first and second edge of said recessed top portion to abut at least a portion of an undersurface of each of said protuberances; and
- said lower edge portions comprise a releasable dovetail interlock, each of said elongated protuberances comprises an eave that extends over a respective one of said first and second edge of said recessed top portion; and further comprising a base extending from, and integral with, said support.

9. A holder for receiving a placard with indicia, comprising:
- a unitary upper member having a backing and a front face adapted to receive the placard therebetween such that at least a portion of the indicia may be visible through said front face;
- said front face having a lower edge portion opposite a lower edge portion of said backing, both said lower edge portions being engaged within a recessed top portion of a support member;
- an outwardly-directed elongated protuberance extending in spaced relationship above, and generally along, each of said lower edge portions;
- a first and second edge of said recessed top portion to abut at least a portion of an undersurface of each of said protuberances; and
- said lower edge portions are shaped to comprise a releasable interlock, each said lower edge portion has an outwardly-bulbous shape and said recessed top portion has a correspondingly contoured inside surface, and said first and second edges extend generally in parallel along said recessed top portion.

10. A holder for receiving a placard with indicia, comprising:
- a unitary upper member having a backing and a front face adapted to receive the placard therebetween such that at least a portion of the indicia may be visible through said front face;
- said front face having a lower edge portion opposite a lower edge portion of said backing, both said lower edge portions being engaged within a recessed top portion of a support member;
- an outwardly-directed elongated protuberance extending in spaced relationship above, and generally along, each of said lower edge portions;
- a first and second edge of said recessed top portion to abut at least a portion of an undersurface of each of said protuberances; and
- said front face has a transparent polymeric-window section through which the indicia is visible; a first vertical-side of said backing is sealed along a first vertical-side of said front face; and said recessed top portion has a closed end and an open end for receipt, by a sliding engagement, of said lower edge portions.

11. A holder for receiving a placard with indicia, comprising:
- a unitary upper member having a backing and a front face adapted to receive the placard therebetween such that at least a portion of the indicia may be visible through said front face;
- said front face having a lower edge portion opposite a lower edge portion of said backing, both said lower edge portions in snap-fit engagement within a recessed top portion of a support member;
- an outwardly-directed elongated protuberance extending in spaced relationship above, and generally along, each of said lower edge portions;
- a first and second edge of said recessed top portion to abut at least a portion of an undersurface of each of said protuberances; and
- each of said protuberances is generally outwardly-sloped and juxtaposed an inwardly-tapered outside surface of a respective eave, each of said eaves to extend over a respective one of said first and second edges of said recessed top portion.

* * * * *